(12) United States Patent
Yoshimura

(10) Patent No.: US 6,646,917 B1
(45) Date of Patent: Nov. 11, 2003

(54) STORAGE DEVICE MANAGING NONVOLATILE MEMORY BY CONVERTING LOGICAL ADDRESS TO PHYSICAL ADDRESS OF NONVOLATILE MEMORY

(75) Inventor: Yoshimasa Yoshimura, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/400,463

(22) Filed: Mar. 28, 2003

(30) Foreign Application Priority Data

Oct. 10, 2002 (JP) ........................................ 2002-297411

(51) Int. Cl.[7] .............................................. G11C 16/04
(52) U.S. Cl. .............................. 365/185.11; 365/230.03; 365/230.01; 365/239
(58) Field of Search ................... 365/185.11, 230.03, 365/230.01, 239

(56) References Cited

U.S. PATENT DOCUMENTS 5,673,383 A * 9/1997 Sukegawa ...................... 714/8
5,822,142 A * 10/1998 Hicken ........................... 360/53
6,347,051 B2 * 2/2002 Yamagami et al. ...... 365/185.09

FOREIGN PATENT DOCUMENTS

JP  P2001-142774 A  5/2001

* cited by examiner

Primary Examiner—Richard Elms
Assistant Examiner—Tuan T. Nguyen
(74) Attorney, Agent, or Firm—McDermott, Will & Emery

(57) ABSTRACT

A flash memory includes a user block for storage of user data, an alternate block reserved for substitution, a conversion table for storage of a physical address of the user block corresponding to a logical address, and an alternate table for storage of a physical address of the alternate block. A controller refers to the conversion table for writing the user data to a page within the user block. If the relevant page has data already written therein, the controller refers to the alternate table and writes the user data to a page within the alternate block to use it as a new user block, and switches the original user block to an alternate block. This permits rapid rewriting of the user data.

8 Claims, 10 Drawing Sheets

FIG.2

| KIND OF DATA | CONTENT |
|---|---|
| USER BLOCK | REGION ASSIGNED WITH LOGICAL ADDRESS AND USED TO STORE ARBITRARY USER DATA |
| CONVERSION TABLE | STORE PHYSICAL ADDRESS CORRESPONDING TO LOGICAL ADDRESS OF USER BLOCK |
| ALTERNATE BLOCK | RESERVED FOR REWRITING OF USER BLOCK AND FOR REPLACEMENT OF DEFECTIVE BLOCK |
| ALTERNATE TABLE | STORE PHYSICAL ADDRESS OF ALTERNATE BLOCK AND THE NUMBER OF ALTERNATE BLOCKS |
| POINTER TABLE | STORE PHYSICAL ADDRESSES OF CONVERSION TABLE, ALTERNATE TABLE AND POINTER TABLE ALTERNATE BLOCK, AND THE NUMBER OF POINTER TABLE ALTERNATE BLOCKS |
| POINTER TABLE ALTERNATE BLOCK | RESERVED FOR SUBSTITUTION OF POINTER TABLE |

FIG.3A

| WORD ADDRESS | CONTENT | SIZE |
|---|---|---|
| 256-263 | ECC + DATA-WRITTEN FLAG | 16 BYTES |
| 255 | PHYSICAL BLOCK ADDRESS OF LOGICAL BLOCK [255] | 2 BYTES |
| ⋮ | ⋮ | ⋮ |
| 1 | PHYSICAL BLOCK ADDRESS OF LOGICAL BLOCK [1] | 2 BYTES |
| 0 | PHYSICAL BLOCK ADDRESS OF LOGICAL BLOCK [0] | 2 BYTES |

FIG.3B

| WORD ADDRESS | CONTENT | SIZE |
|---|---|---|
| 256-263 | ECC + DATA-WRITTEN FLAG | 16 BYTES |
| 255 | PHYSICAL BLOCK ADDRESS OF LOGICAL BLOCK [N×256+255] | 2 BYTES |
| ⋮ | ⋮ | ⋮ |
| 1 | PHYSICAL BLOCK ADDRESS OF LOGICAL BLOCK [N×256+1] | 2 BYTES |
| 0 | PHYSICAL BLOCK ADDRESS OF LOGICAL BLOCK [N×256+0] | 2 BYTES |

| WORD ADDRESS | CONTENT | SIZE |
|---|---|---|
| 256-263 | ECC + DATA-WRITTEN FLAG | 16 BYTES |
| ⋮ | ⋮ | ⋮ |
| M+1 | PHYSICAL BLOCK ADDRESS OF ALTERNATE BLOCK [M] | 2 BYTES |
| ⋮ | ⋮ | ⋮ |
| 1 | PHYSICAL BLOCK ADDRESS OF ALTERNATE BLOCK [0] | 2 BYTES |
| 0 | NUMBER OF REMAINING ALTERNATE BLOCKS | 2 BYTES |

FIG.6

| WORD ADDRESS | CONTENT | SIZE |
|---|---|---|
| 256-263 | ECC + DATA-WRITTEN FLAG + ID CODE | 16 BYTES |
| ... | ... | ... |
| 26 | PHYSICAL BLOCK ADDRESS OF POINTER TABLE ALTERNATE BLOCK [9] | 2 BYTES |
| ... | ... | ... |
| 18 | PHYSICAL BLOCK ADDRESS OF POINTER TABLE ALTERNATE BLOCK [0] | 2 BYTES |
| 17 | POINTER TABLE ALTERNATE BLOCK REMAINING NUMBER | 2 BYTES |
| 16 | PHYSICAL BLOCK ADDRESS OF ALTERNATE TABLE | 2 BYTES |
| ... | ... | ... |
| N | PHYSICAL BLOCK ADDRESS OF TABLE [N] | 2 BYTES |
| ... | ... | ... |
| 1 | PHYSICAL BLOCK ADDRESS OF TABLE [1] | 2 BYTES |
| 0 | PHYSICAL BLOCK ADDRESS OF TABLE [0] | 2 BYTES |

STORAGE DEVICE MANAGING NONVOLATILE MEMORY BY CONVERTING LOGICAL ADDRESS TO PHYSICAL ADDRESS OF NONVOLATILE MEMORY

BACKGROUND OF THE INVENTION

1. Field of the Invention

The present invention relates to storage devices which manage nonvolatile semiconductor memories, and more particularly to a storage device which converts a logical address to a physical address of a nonvolatile semiconductor memory for management of the nonvolatile semiconductor memory.

2. Description of the Background Art

Of various nonvolatile semiconductor memories, a NAND-type flash memory has recently become widespread as one for mass data storage. With the NAND-type flash memory, data are erased in a unit of block that is formed of a plurality of pages, and are written only in a unit of page for a page having data erased therefrom.

In a conventional storage device formed of such a NAND-type flash memory, if a user wishes to rewrite data of one page, he/she cannot write data directly to the relevant page. It is necessary to erase data on the page before writing of new data, or to write the new data to a page in another block having data erased therefrom.

Japanese Patent Laying-Open No. 2001-142774 discloses a related technique, i.e., an address converting method which makes it unnecessary to increase a nonvolatile memory area for an address converting table even when the storage capacity of a rewritable nonvolatile memory increases.

The conventional storage device formed of the above-described NAND-type flash memory is disadvantageous in that, when new data is to be written after erasing data on the relevant page, the data must be erased on the block basis. This means that data on pages other than the relevant page should be saved before data erasing; otherwise, the data on the pages other than the relevant page would also be erased. As such, the rewriting of the data to the relevant page would take a long time, leading to degradation in processing speed of the processor.

In the case where data is to be written into another block having data erased therefrom, address management becomes necessary to make sure data in which area is written on what number of page in which block. It is also necessary to manage information indicating that the page which originally stored the data is now invalid. As such, updating of the management information associated with the data rewriting would become complicated, and the amount of the management information would also increase.

Further, although the address converting method disclosed in Japanese Patent Laying-Open No. 2001-142774 converts a logical address to a physical address of a flash memory, it cannot solve the above-described problems, since it does not take account of data rewrite based on data erase in units of blocks.

SUMMARY OF THE INVENTION

An object of the present invention is to provide a storage device which permits rapid rewriting of user data in a nonvolatile semiconductor memory.

According to an aspect of the present invention, the storage device includes a nonvolatile semiconductor memory having data erased in a unit of block that is formed of a plurality of pages and written in a unit of page for a page having data erased therefrom, and a control portion controlling the nonvolatile semiconductor memory.

The nonvolatile semiconductor memory includes a user block for storage of the user data, an alternate block reserved for substitution, a conversion table for storage of a physical address of the user block corresponding to a logical address, and an alternate table for storage of a physical address of the alternate block.

The control portion refers to the conversion table for writing the user data to a page within the user block. At this time, if the relevant page has data written therein, the control portion refers to the alternate table and writes the user data to a page within the alternate block. The alternate block is now used as a new user block, and the original user block is used as the alternate block. This enables rapid rewriting of the user data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates kinds of data stored in a flash memory 1.

FIGS. 3A and 3B show contents of conversion tables by way of example.

FIG. 6 shows contents of a pointer table by way of example.

DESCRIPTION OF THE PREFERRED EMBODIMENTS

There are a variety of NAND-type flash memories different in page size and block size. For example, one flash memory has a page of 528 bytes and a block of 32 pages, and another flash memory has a page of 2112 bytes and a block of 64 pages. In the present embodiment, a storage device employing a flash memory having a page of 528 bytes and a block of 32 pages is described, although the configuration of the flash memory is not limited thereto.

Figure 1:
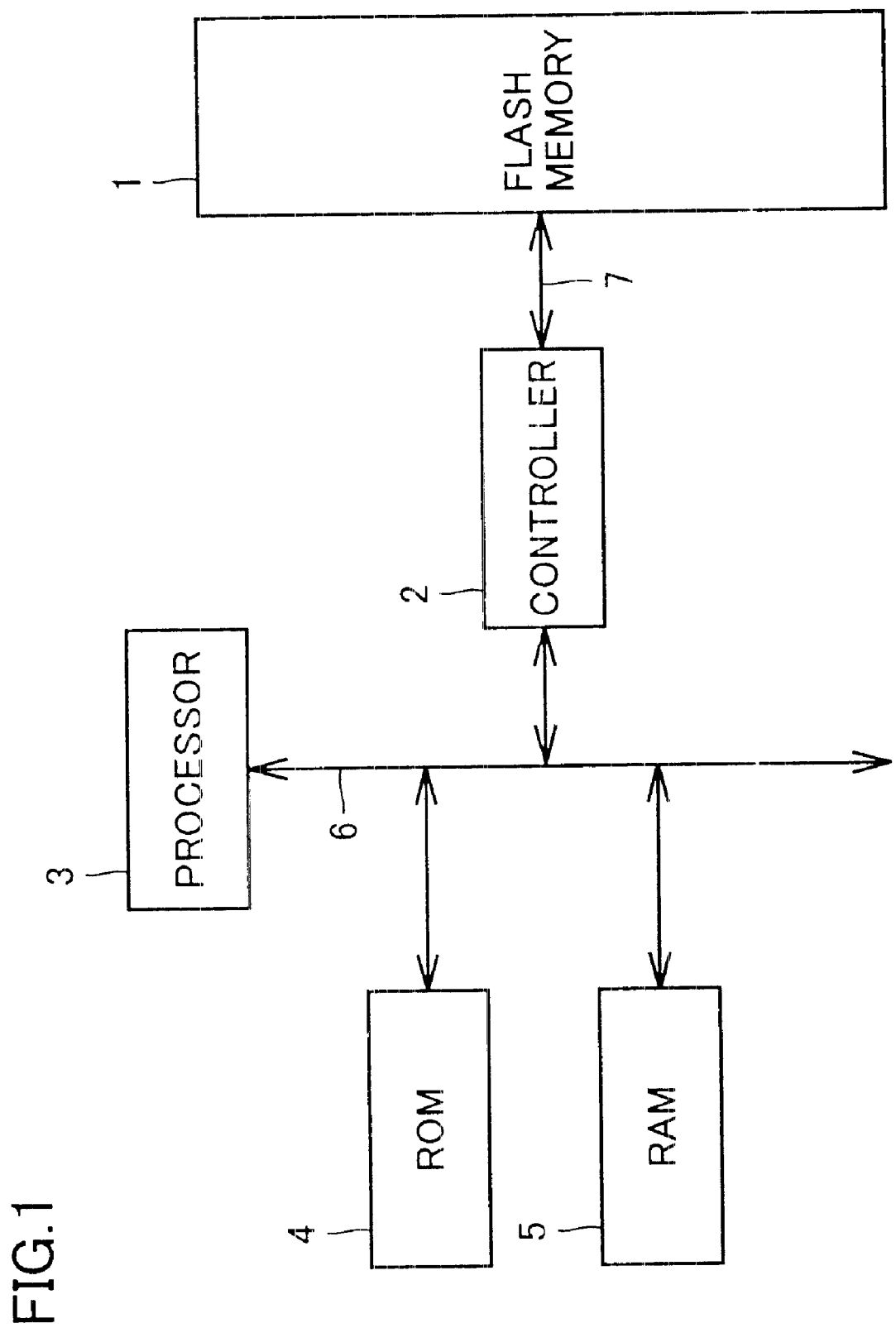
FIG. 1 is a block diagram showing a schematic configuration of a storage device according to an embodiment of the present invention.

Referring to FIG. 1, the storage device according to the present embodiment includes: a NAND-type flash memory 1; a processor 3; a controller 2 which, for an access from processor 3 to flash memory 1, controls generation of a control signal to flash memory 1, an error correction process and others; a read only memory (ROM) 4; and a random access memory (RAM) 5.

Controller 2, processor 3, ROM 4 and RAM 5 are connected by a processor bus 6. Flash memory 1 and controller 2 are connected by a memory bus 7.

ROM 4 stores, among others, instruction codes to be executed by processor 3. RAM 5 is utilized, e.g., as a work area of processor 3, where variables are stored and data read out of flash memory 1 are temporarily stored.

Controller 2 generates flash memory control signals for application of a flash memory command when processor 3 is to access flash memory 1 and for transfer of read/write data. Further, controller 2 performs the error correction process upon data read, and generates and writes error correcting codes to flash memory 1 upon data write.

Controller 2 may be configured to take the place of processor 3 to carry out the processing, as will be described later, by executing the instruction codes stored in ROM 4.

Flash memory 1 stores various kinds of data as shown in FIG. 2. A user block is a region for storage of arbitrary user data, to which a logical address is assigned per block.

A conversion table stores a physical address corresponding to the logical address assigned to the respective user block. An alternate block is a region reserved for rewriting of the user block or for replacement of a defective block.

An alternate table stores a physical address of the alternate block and the number of alternate blocks. A pointer table stores physical addresses of the conversion table, alternate table and pointer table alternate block, and the number of pointer table alternate blocks. The pointer table alternate block is a region reserved for substitution of the pointer table.

FIGS. 3A and 3B show contents of the conversion tables by way of example. With a physical block address expressed with two bytes, the conversion table of one page (512 bytes), except for a redundant data region of 16 bytes, is able to manage 256 user blocks.

FIG. 3A shows a 0th conversion table which stores physical addresses of logical blocks 0–255. FIG. 3B shows an Nth conversion table which stores physical addresses of logical blocks N×256 to N×256+255. In the case of a flash memory of 512 Mb, the number of physical blocks is 4096 and N is 15. Thus, 16 pages of conversion tables exist.

Each page includes the redundant data region of 16 bytes (word offsets 256–263). This region stores an error correcting code ECC and a flag indicating that data has been written in the page (hereinafter, referred to as the "data-written flag").

Figures 4, 5:
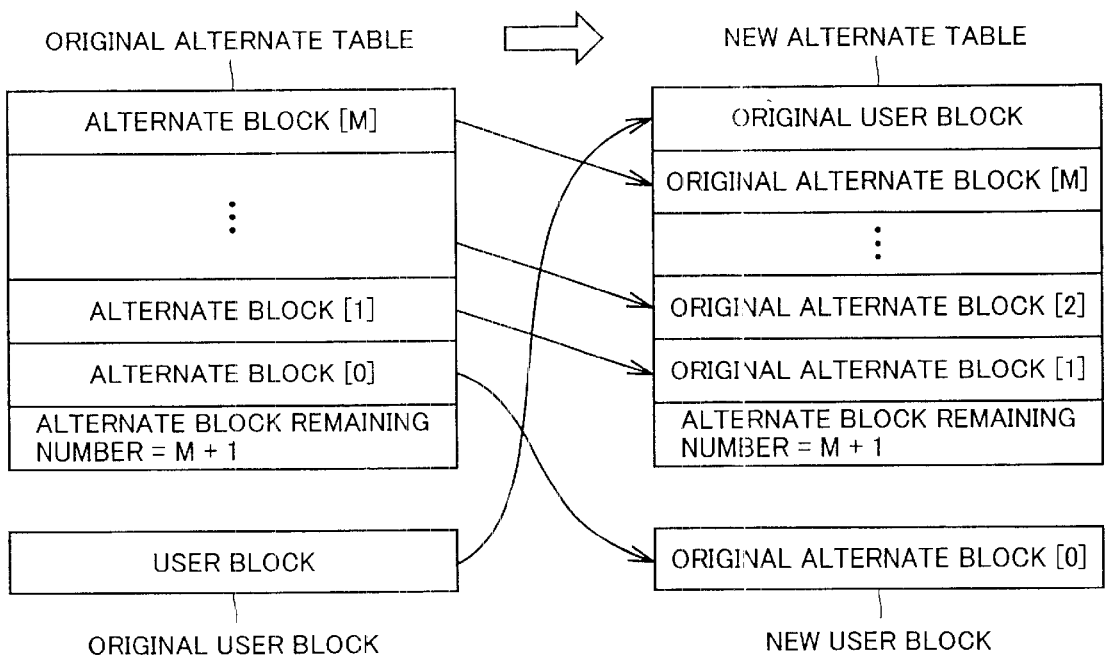
FIG. 4 shows contents of an alternate table by way of example.
FIG. 5 schematically shows how the contents of the alternate table are updated.

FIG. 4 shows contents of the alternate table by way of example. The number of remaining alternate blocks is stored in a region of word offset 0, and physical addresses of the 0th through Mth alternate blocks are stored in the succeeding regions. The redundant data region of word offsets 256-263 stores error correcting code ECC and the data-written flag indicating that the page has data written therein.

FIG. 5 schematically shows how the contents of the alternate table are updated. Upon writing of data to a page in a user block, if the page in the user block (original user block) has data written therein, the user block is replaced with an alternate block, and the alternate block is used as a new user block. The alternate block being used is an alternate block [0] that is stored in the lowermost order of the alternate table. This alternate block is written with the user data and used as the new user block. In the alternate table, the contents (alternate blocks [1]≧[M]) are shifted downward by 2 bytes each, so that the original alternate block [1] is stored in the lowermost order of the new alternate table, and becomes a new alternate block [0].

The original user block has its data erased. When the erase is completed without fail, the physical address of the block is stored in the uppermost order of the new alternate table, and the block is ready for later use as a new alternate block [M]. The number of remaining alternate blocks is unchanged from M+1 with the successful block erase. On the contrary, if an error occurs during the block erase, the alternate block remaining number becomes M as decremented by 1.

FIG. 6 shows by way of example contents of the pointer table. Physical block addresses of conversion tables [0]–[N] are stored in respective regions of word offsets 0–N. The physical block address of the alternate table is stored in the region of word offset 16. The number of remaining pointer table alternate blocks is stored in the region of word offset 17, and physical block addresses of pointer table alternate blocks [0]–[9] are stored in the subsequent regions. Although ten blocks have been reserved as the pointer table alternate blocks in the present embodiment, any number of blocks may be prepared.

In the redundant data region of word offsets 256 and thereafter, error correcting code ECC, the data-written flag indicating that the page is written with data, and an ID code for identification of the block as the pointer table, are stored.

The pointer table is stored in a prescribed address range of, e.g., block addresses 0-255. Immediately after power up, processor 3 searches ID codes of the pages within this range to identify the pointer table, and obtains the contents. Once the contents of the pointer table are obtained, processor 3 is able to refer to all the physical block addresses in which information necessary for control of flash memory 1 described above is stored.

To limit the storage range of the pointer table to, e.g., block addresses 0-255, it is necessary to reserve a prescribed number of pointer table alternate blocks within the relevant range.

Figure 7:
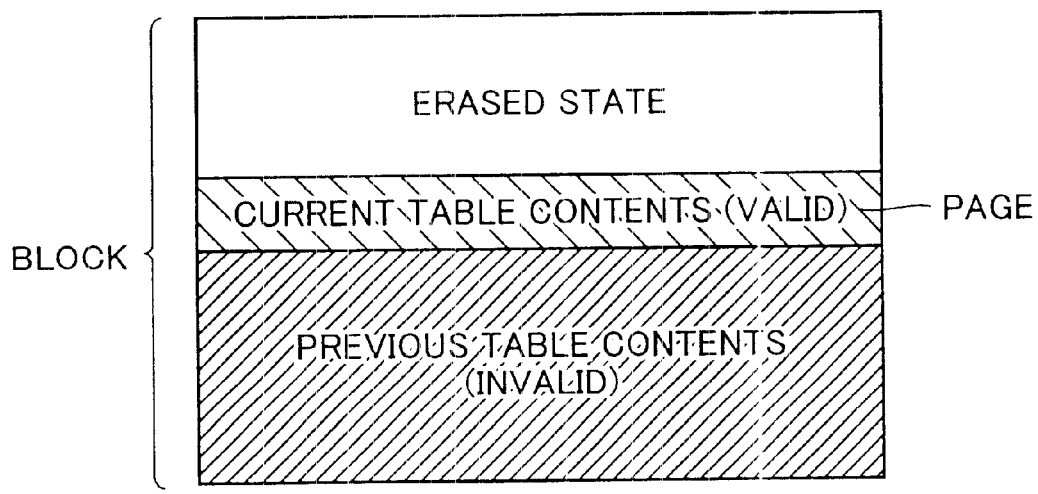
FIG. 7 shows a block storing contents of a table (conversion table, alternate table, or pointer table).

FIG. 7 shows a block storing contents of a table (conversion table, alternate table, or pointer table). Each table has only one page in a block used as valid data. Upon rewriting of the table, new contents of the table are written to a page within the block having a page offset incremented by 1. Thus, data stored in the uppermost page among the pages in the data-non-erased state, or data-retaining state, become the valid contents of the table.

When data have been written up to the uppermost page of the block, the entire block is once erased, and contents of the new table are written to a leading page. The page storing the valid contents of the table is identified by searching for the data-written flag stored in the redundant data region on and after word offset 256, and the contents are obtained. Once the valid table is located and its contents are obtained, the word offset value is stored and managed in the work area of RAM 5, eliminating the need to locate the block storing the table every time it is required.

Figure 8:
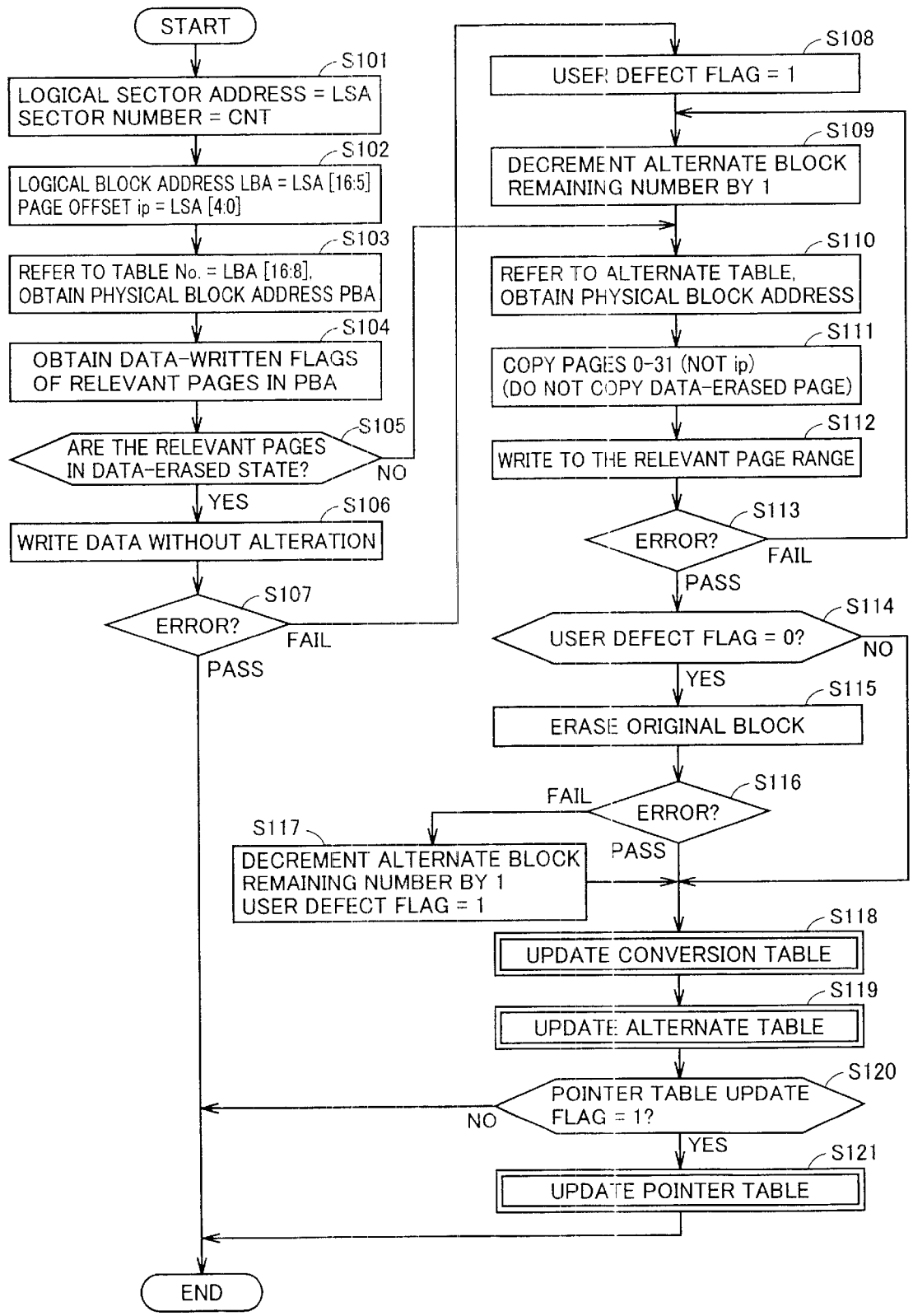
FIG. 8 is a flowchart illustrating processing procedure of the storage device according to the embodiment of the present invention.

The processing procedure of the storage device according to the present embodiment is now explained with reference to FIG. 8. Firstly, processor 3 determines a logical sector address LSA of a region from which writing of user data is to be started, and a number of sectors CNT to which the data are to be written (S101). Here, it is assumed that one sector has 512 bytes, the same as one page.

Next, processor 3 calculates, from logical sector address LSA, a logical block address LBA and a page offset ip within the block (S102). Here, since one block has 32 pages, logical block address LBA=LSA [16:5], and ip=LSA [4:0].

Next, processor 3 refers to the contents of the conversion table, and obtains a physical block address PBA corresponding to logical block address LBA (S103). With one conversion table storing information for 256 blocks, the number of the conversion table storing physical block address PBA corresponding to logical block address LBA is: LBA/256= LBA [11:8].

Once the number of the conversion table is obtained, the physical block address of the conversion table is obtained by referring to the pointer table, and thus, the contents of the relevant conversion table can be read out. Physical block address PBA is stored in the conversion table at the word address of LBA [7:0].

Next, processor 3 obtains data-written flags of pages for the number of sectors CNT, starting from the page having page offset of ip, within the block having physical block address of PBA (S104). Processor 3 then determines whether all the pages as the targets of writing are in a data-erased state (S105).

If any of the pages as the targets of writing is not in the data-erased state (No in S105), process goes to step S110, where a block alternating process is performed. If there is no page in the data-erased state (Yes in S105), data output from processor 3 are written to the pages as the targets of writing, without any further process (S106). Processor 3 then reads a status of flash memory 1 to determine whether the writing has been completed without fail (S107).

When the writing has been completed successfully (pass in S107), process is finished. If the writing has ended with an error (fail in S107), the block is determined as a defective block, and a user defect flag is set to "1" (S108). The number of remaining alternate blocks is decremented by 1 (S109), and the block alternating process is performed in and after step S110.

In step S110, processor 3 refers to the alternate table to obtain a physical block address of an alternate block, and copies, from the original user block to the alternate block, the data of pages other than the pages as the targets of writing (S111). Here, it is unnecessary to copy pages in the data-erased states in the original user block to the alternate block.

Next, processor 3 writes data to the pages as the targets of writing (S112), and determines whether the writing has been completed without fail (S113). If so (pass in S113), process goes to step S114. When an error has occurred during the writing (fail in S113), process returns to step S109 to perform data writing with respect to another alternate block.

In step S114, processor 3 checks the user defect flag. If the flag is "0" (Yes in S114), the original user block is erased (S115), and it is determined whether the erasing has been completed without fail (S116). If so (pass in S116), process goes to step S118.

If an error has occurred during the erasing (fail in S116), the number of remaining alternate blocks is decremented by 1, and the user defect flag is set to "1" (S117). Process then goes to step S118. In step S114, if the user defect flag is "1" (No in S114), process goes to step S118.

Processor 3 updates the contents of the conversion table (S118), and updates the contents of the alternate table (S119). The updating processes of the contents of the conversion table and the alternate table will be described later in detail.

Next, processor 3 determines whether a pointer table update flag is "1" (S120). If the flag is not "1" (No in S120), the process is finished. If the pointer table update flag is "1" (Yes in S120), the contents of the pointer table are updated (S121) before the end of the process. The updating of the contents of the pointer table will be described later in detail.

Figure 9:
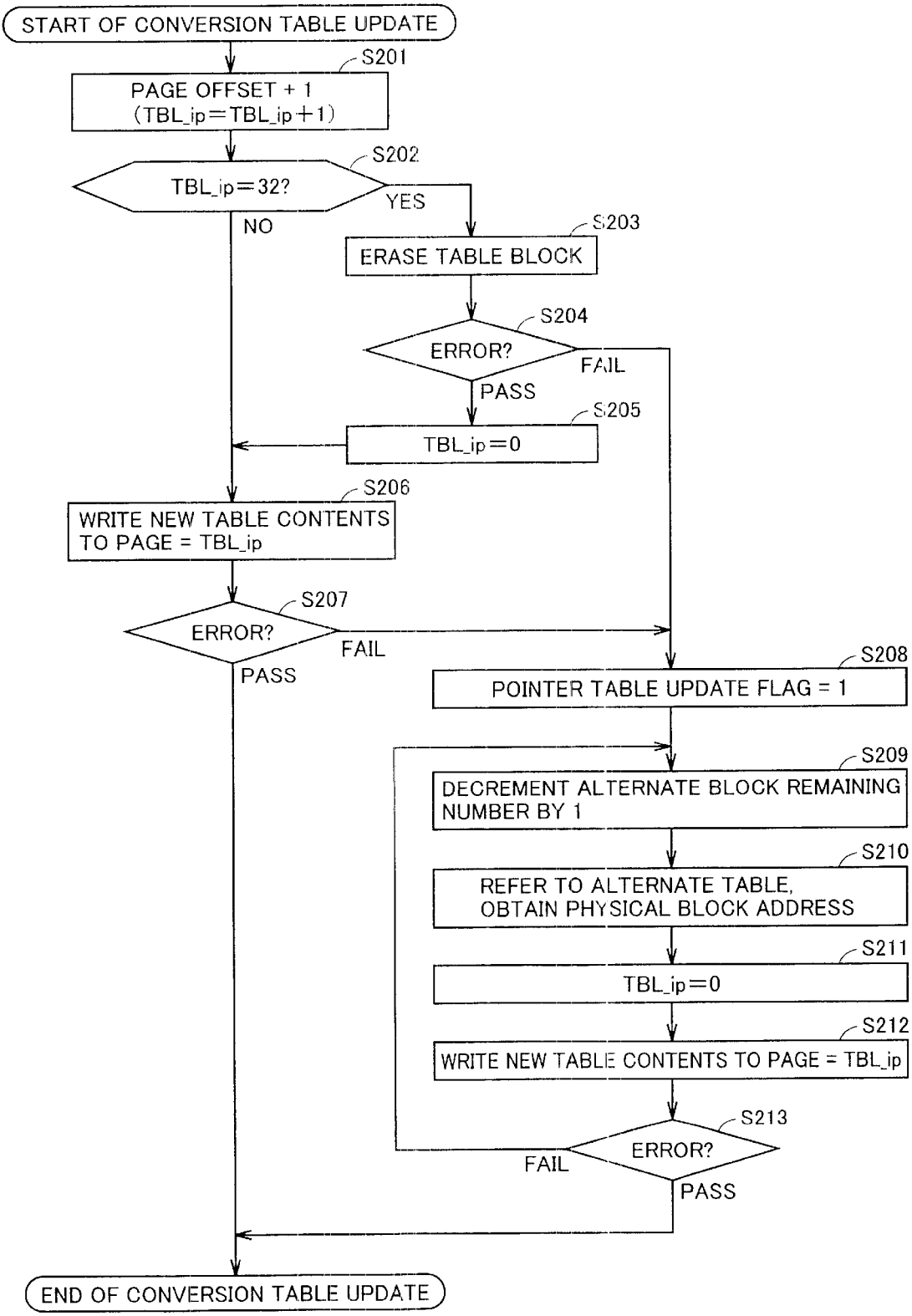
FIG. 9 is a flowchart illustrating processing procedure of the updating process (S118) of contents of the conversion table.

FIG. 9 illustrates the processing procedure of the updating process of the contents of the conversion table (S118). Firstly, processor 3 increments, by 1, a page offset number TLB_ip of the page having valid data stored therein, within the block storing the conversion table (S201). Page offset number TLB_ip is obtained by searching for the block storing the conversion table, only at the first time of reference. At the subsequent times of reference, it is obtained by referring to the contents stored in the work area within the RAM.

Next, processor 3 determines whether page offset number TLB_ip has reaches an upper limit (S202). Here, with one block having 32 pages, it is determined whether TLB_ip is 32. When page offset number TLB_ip is not 32 (No in S202), process goes to step S206.

If page offset number TLB_ip is 32 (Yes in S202), the conversion table block is erased (S203), and it is determined whether the erasing has been completed successfully (S204). If so (pass in S204), page offset number TLB_ip is set to 0 (S205), and process goes to step S206. If an error has occurred during the erasing (fail in S204), process goes to step S208, where the conversion table alternating process is carried out.

In step S206, processor 3 writes the contents of the new conversion table to a page having a page offset number of TLB_ip, and determines whether the writing has been completed without fail (S207). If so (pass in S207), process is completed. If an error has occurred during the writing (fail in S207), process goes to step S208, where the conversion table alternating process is performed.

Processor 3 sets the pointer table update flag to "1" (S208), and decrements the number of remaining alternate blocks by 1 (S209). Processor 3 refers to the alternate table to obtain the physical block address of the alternate block (S210). Processor 3 then initializes the page offset number TLB_ip to 0, since the alternate block is in a data-erased state (S211).

Next, processor 3 writes the contents of the new conversion table to the page as the target of writing (S212), and determines whether the writing has been completed without fail (S213). If so (pass in S213), process is completed. If an error has occurred during the writing (fail in S213), process returns to step S209, and data writing is performed with respect to another alternate block.

Figure 10:
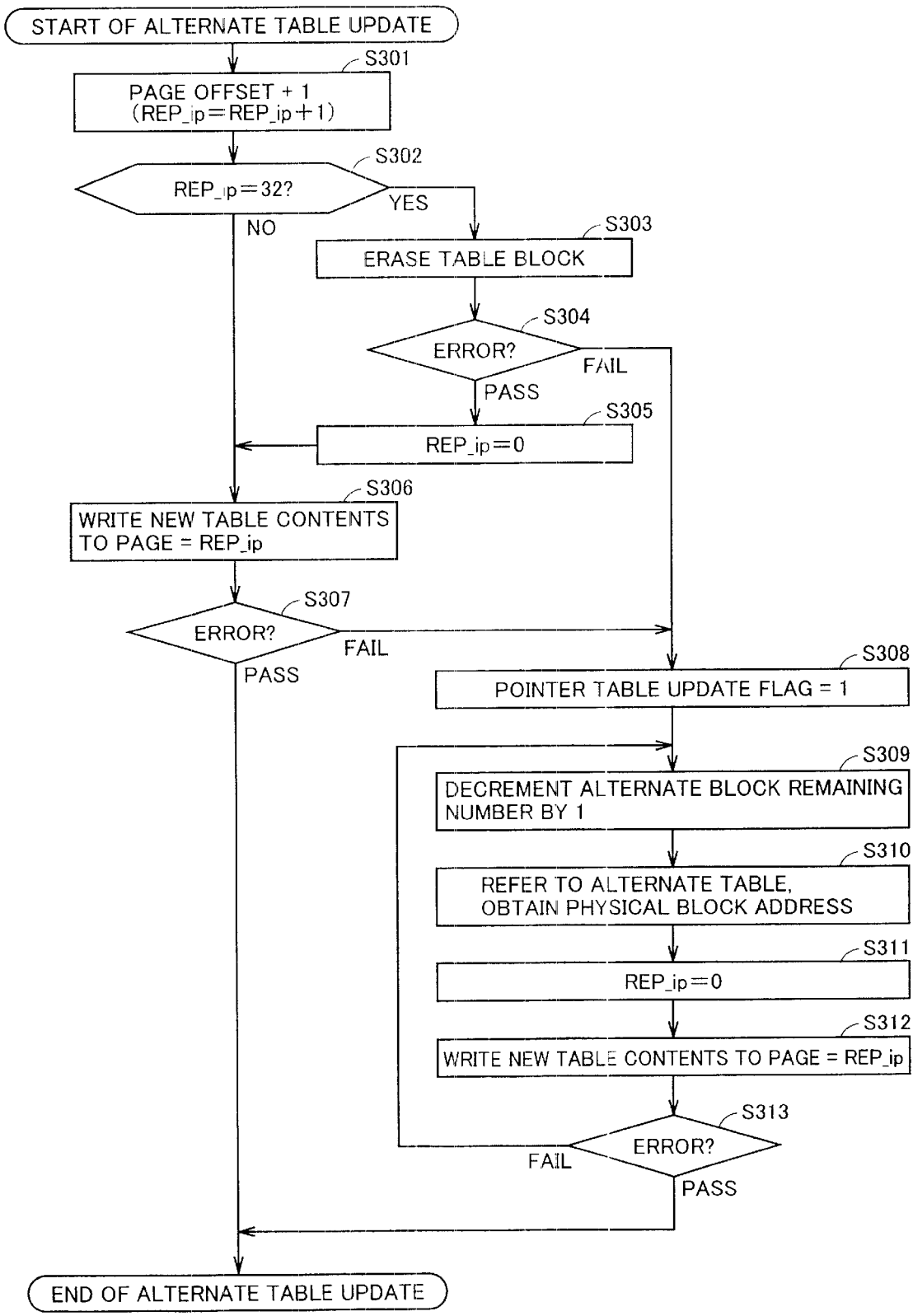
FIG. 10 is a flowchart illustrating processing procedure of the updating process (S119) of contents of the alternate table.

FIG. 10 illustrates the processing procedure of the updating process of the contents of the alternate table (S119). Firstly, processor 3 increments, by 1, the page offset number REP_ip of the page storing valid data within the block having the alternate table stored therein (S301). Page offset number REP_ip is obtained by searching for the block storing the alternate table only at the first time of reference. Subsequently, it is obtained by referring to the contents stored in the work area within the RAM.

Next, processor 3 determines whether page offset number REP_ip has reached an upper limit (S302). Here, with one block having 32 pages, it is determined whether REP_ip is 32. If not (No in S302), process goes to step S306.

When page offset number REP_ip is 32 (Yes in S302), the alternate table block is erased (S303), and it is determined whether the erasing has been completed without fail (S304). If so (pass in S304), page offset number REP_ip is set to 0 (S305), and process goes to step S306. If an error has occurred during the erasing (fail in S304), process goes to step S308, where the alternating process of the alternate table is carried out.

In step S306, processor 3 writes the contents of the new alternate table to a page having page offset number of REP_ip, and determines whether the writing has been completed without fail (S307). If so (pass in S307), process is finished. If an error has occurred during the writing (fail in S307), process goes to step S308 for the alternate table alternating process.

Processor 3 sets a pointer table update flag to"1" (S308), and decrements the number of remaining alternate blocks by 1 (S309). Processor 3 refers to the alternate table to obtain the physical block address of the alternate block (S310). Processor 3 then initializes page offset number REP_ip to 0, since the alternate block is in the data-erased state (S311).

Next, processor 3 writes the contents of the new alternate table to the page as the target of writing (S312), and determines whether the writing has been completed without fail (S313). If so (pass in S313), process is finished. If an error has occurred during the writing (fail in S313), process returns to step S309 to write data to another alternate block.

Figure 11:
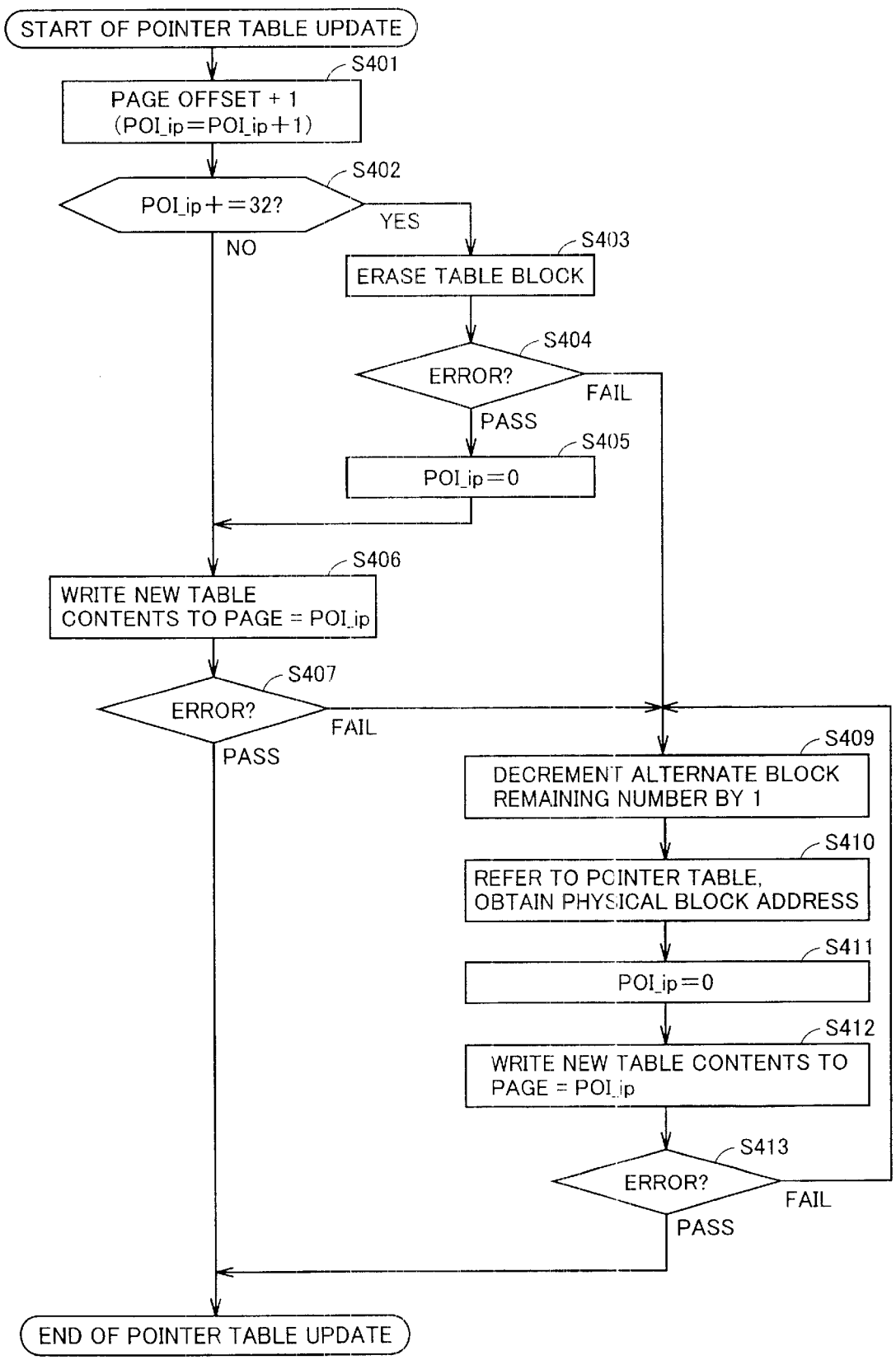
FIG. 11 is a flowchart illustrating processing procedure of the updating process (S121) of contents of the pointer table.

FIG. 11 illustrates the processing procedure of the updating process of the contents of the pointer table (S121). Firstly, processor 3 increments, by 1, a page offset number POI_ip of the page storing valid data within the block storing the pointer table (S401). Page offset number POI_ip is obtained by searching for the block storing the pointer table only at the first time of reference. Subsequently, it is obtained by referring to the contents stored in the work area within the RAM.

Next, processor 3 determines whether page offset number POI_ip has reached an upper limit (S402). Here, with one block having 32 pages, it is determined whether POI_ip is 32. If not (No in S402), process goes to step S406.

If page offset number POI_ip is 32 (Yes in S402), the pointer table block is erased (S403), and it is. determined whether the erasing has been completed without fail (S404). If so (pass in S404), page offset number POI_ip is set to 0 (S405), and process goes to step S406. If an error has occurred during the erasing (fail in S404), process goes to step S409, wherein the alternating process of the pointer table is performed.

In step S406, processor 3 writes the contents of the new pointer table to a page having a page offset number of POI_ip, and determines whether the writing has been completed without fail (S407). If so (pass in S407), process is finished. If an error has occurred during the writing (fail in S407), process goes to S409 to perform the pointer table alternating process.

In step S409, processor 3 decrements the number of remaining pointer table alternate blocks by 1. Processor 3 refers to the pointer table to obtain the physical block address of the pointer table alternate block (S410). Processor 3 then initializes page offset number POI_ip to 0, since the pointer table alternate block is in the data-erased state (S411).

Next, processor 3 writes the contents of the new pointer table to the page as the target of writing (S412), and determines whether the writing has been completed without fail (S413). If so (pass in S413), process is finished. If an error has occurred during the writing (fail in S413), process returns to step S409 to perform data writing to another pointer table alternate block.

For the data reading from flash memory 1, rewriting of data stored in flash memory 1 does not occur. Thus, processor 3 simply determines a page as a target of reading, from a physical block address and a page offset obtained from a conversion table, and reads data from the relevant page.

As described above, according to the storage device of the present embodiment, if a page within a user block to which user data is to be written has data already written therein, the user data is written into an alternate block, which becomes a new user block, and the contents of the original user block are erased to use the relevant block as an alternate block. This permits rapid rewriting of the contents of the user block.

Further, at the time of rewriting contents of the conversion table, alternate table or pointer table, contents of the new table are sequentially written to pages in the data-erased state. Thus, management information can be rewritten rapidly, and the processing associated with the rewriting of the user block contents can also be performed at high speed. In the case of controlling flash memory 1 by a control program, the size of the program can be reduced.

Still further, if a writing error or erasing error occurs on a block, data are written into another alternate block, and the relevant block is managed as a user block, pointer table block or the like. As such, the user can access flash memory 1 as consecutive logical block spaces, which facilitates construction of a file system and others.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage device, comprising:
   a nonvolatile semiconductor memory having data erased in a unit of block that is formed of a plurality of pages and written in a unit of page for a page having data erased therefrom; and
   a control portion controlling said nonvolatile semiconductor memory;
   said nonvolatile semiconductor memory including
      a user block storing user data,
      an alternate block reserved for substitution,
      a conversion table storing a physical address of said user block corresponding to a logical address, and
      an alternate table storing a physical address of said alternate block, and
      said control portion, when referring to said conversion table for writing the user data to a page within the user block, if the relevant page has data written therein, referring to said alternate table and writing the user data to a page within said alternate block, so that said alternate block becomes a new user block, while the original user block becomes a new alternate block.

2. The storage device according to claim 1, wherein to switch said alternate block to the new user block, said control portion uses the alternate block written in a prescribed region of said alternate table as the user block, sequentially shifts contents of said alternate table by one block each, and adds said original user block to said alternate table as the new alternate block.

3. The storage device according to claim 1, wherein
   a flag indicating that data has been written is set to a page having the user data written therein in said user block, and said control portion refers to said flag to determine whether the relevant page has data written therein.

4. The storage device according to claim 1, wherein said nonvolatile semiconductor memory further includes a pointer table storing physical addresses of said conversion table and said alternate table, and said control portion refers to said pointer table to obtain contents of said conversion table and said alternate table.

5. The storage device according to claim 4, wherein said nonvolatile semiconductor memory further includes a pointer table alternate block reserved for substitution of said pointer table, said pointer table further stores a physical address of said pointer table alternate block, and when a write error occurs during rewriting of contents of said pointer table, said control portion refers to the contents of said pointer table and writes new contents of said pointer table to said pointer table alternate block.

6. The storage device according to claim 4, wherein valid data of said pointer table exists only on a page of a block, and said control portion, when rewriting the contents of said pointer table, writes new data to a page of an upper page number and sets a flag indicating that the relevant page has data written therein, and when a page of an uppermost page number has data written therein, said control portion erases contents of the relevant block and writes the new data to a page of a lowermost page number.

7. The storage device according to claim 1, wherein valid data of said conversion table exists only on a page of a block, and said control portion, when rewriting the contents of said conversion table, writes new data to a page of an upper page number and sets a flag indicating that the relevant page has data written therein, and when a page of an uppermost page number has data written therein, said control portion erases contents of the relevant block and writes the new data to a page of a lowermost page number.

8. The storage device according to claim 1, wherein valid data of said alternate table exists only on a page of a block, and said control portion, when rewriting the contents of said alternate table, writes new data to a page of an upper page number and sets a flag indicating that the relevant page has data written therein, and when a page of an uppermost page number has data written therein, said control portion erases contents of the relevant block and writes the new data to a page of a lowermost page number.

* * * * *

UNITED STATES PATENT AND TRADEMARK OFFICE
CERTIFICATE OF CORRECTION

PATENT NO. : 6,646,917 B1
DATED : November 11, 2003
INVENTOR(S) : Yoshimasa Yoshimura It is certified that error appears in the above-identified patent and that said Letters Patent is hereby corrected as shown below:

<u>Title page,</u>
Item [73], Assignee, change "Mitsubishi Denki Kabushiki Kaisha, Tokyo (JP)" to
-- Renesas Technology Corp., Tokyo (JP) --

Signed and Sealed this

First Day of June, 2004

JON W. DUDAS
*Acting Director of the United States Patent and Trademark Office*